(12) United States Patent
Kawai

(10) Patent No.: US 8,737,784 B2
(45) Date of Patent: May 27, 2014

(54) OPTICAL COMMUNICATION MODULE AND OPTICAL COMMUNICATION CONNECTOR

(75) Inventor: Hiroki Kawai, Yokosuka (JP)

(73) Assignee: Yazaki Corporation, Tokyo (JP)

( * ) Notice: Subject to any disclaimer, the term of this patent is extended or adjusted under 35 U.S.C. 154(b) by 187 days.

(21) Appl. No.: 13/203,265

(22) PCT Filed: Feb. 25, 2010

(86) PCT No.: PCT/JP2010/052989
§ 371 (c)(1),
(2), (4) Date: Aug. 25, 2011

(87) PCT Pub. No.: WO2010/098395
PCT Pub. Date: Sep. 2, 2010

(65) Prior Publication Data
US 2011/0305415 A1    Dec. 15, 2011

(30) Foreign Application Priority Data

Feb. 25, 2009  (JP) .................................. 2009-041650
Aug. 4, 2009   (JP) .................................. 2009-181173

(51) Int. Cl.
G02B 6/26    (2006.01)
G02B 6/42    (2006.01)
G02B 6/36    (2006.01)

(52) U.S. Cl.
USPC ..................... 385/47; 385/89; 385/92; 385/93

(58) Field of Classification Search
USPC ..................................... 385/47, 93
See application file for complete search history.

(56) References Cited

U.S. PATENT DOCUMENTS

| 5,515,468 A | 5/1996 | DeAndrea et al. |
| 5,708,743 A | 1/1998 | DeAndrea et al. |
| 6,106,160 A * | 8/2000 | Kikuchi et al. ................. 385/88 |
| 6,142,680 A * | 11/2000 | Kikuchi et al. ................. 385/93 |
| 6,282,000 B1 * | 8/2001 | Kikuchi et al. ............... 398/136 |

(Continued)

FOREIGN PATENT DOCUMENTS

| JP | 6-273641 A | 9/1994 |
| JP | 11-64673 A | 3/1999 |

(Continued)

OTHER PUBLICATIONS

International Search Report (PCT/ISA/210) dated Mar. 30, 2010, issued for PCT/JP2010/052989.

(Continued)

*Primary Examiner* — Rhonda Peace
(74) *Attorney, Agent, or Firm* — Sughrue Mion, PLLC

(57) ABSTRACT

A single-core bidirectional optical communication module and a single-core bidirectional optical communication connector are provided which can decrease in size without greatly changing the structure of the past optical connector housing. An optical communication module 1 includes an optical transceiver circuit unit 21 in which a light-emitting element and a light-receiving element are arranged in parallel and an optical path changing component 25 having a structure in which the attachment and detachment direction of an optical fiber cable is perpendicular to the optical transceiver circuit unit 21. An optical communication connector 2 includes a single-core bidirectional optical communication module 1 and an optical connector housing 3 that houses the single-core bidirectional optical communication module 1 so that the optical axis of the optical fiber cable is perpendicular to the optical transceiver circuit unit 21.

13 Claims, 17 Drawing Sheets

(56) References Cited

U.S. PATENT DOCUMENTS

| | | | |
|---|---|---|---|
| 6,341,898 B1 * | 1/2002 | Matsushita | 385/88 |
| 2002/0039475 A1 * | 4/2002 | Furuyama | 385/129 |
| 2002/0110313 A1 * | 8/2002 | Anigbo et al. | 385/24 |
| 2003/0059178 A1 | 3/2003 | Kobayashi et al. | |
| 2008/0226228 A1 | 9/2008 | Tamura et al. | |
| 2008/0247713 A1 | 10/2008 | Tamura et al. | |
| 2009/0202244 A1 | 8/2009 | Jin et al. | |
| 2011/0305415 A1 * | 12/2011 | Kawai | 385/14 |

FOREIGN PATENT DOCUMENTS

| | | |
|---|---|---|
| JP | 2003-98397 A | 4/2003 |
| JP | 2003-149510 A | 5/2003 |
| JP | 2004-138966 A | 5/2004 |
| JP | 2004272061 A | 9/2004 |
| JP | 2007264411 A | 10/2007 |
| JP | 2008-512694 A | 4/2008 |
| JP | 2008-225339 A | 9/2008 |
| JP | 2008-257094 A | 10/2008 |

OTHER PUBLICATIONS

Written Opinion (PCT/ISA/237) dated Mar. 30, 2010, issued for PCT/JP2010/052989.

Office Action issued Dec. 11, 2012 by the Japanese Patent Office in corresponding Japanese Patent Application No. 2009-181173.

Office Action, dated Jan. 17, 2014, issued by the State Intellectual Property Office of the People's Republic of China in counterpart Chinese Application No. 201080009416.X.

* cited by examiner

OPTICAL COMMUNICATION MODULE AND OPTICAL COMMUNICATION CONNECTOR

TECHNICAL FIELD

The present invention is related to an optical communication module and an optical communication connector. Particularly, the present invention relates to a single-core bidirectional optical communication module used to perform bidirectional optical communication using a single optical fiber cable and a single-core bidirectional optical communication connector (optical connector) having the single-core bidirectional optical communication module.

BACKGROUND ART

Optical communication connectors having a structure in which a light-emitting element and a light-receiving element are optically connected to two optical fiber cables have been widely known. Single-core directional optical communication connectors having a structure in which a light-emitting element and a light-receiving element are optically connected to a single optical fiber cable have also been known (for example, see PTL 1).

The single-core bidirectional optical communication connector disclosed in PTL 1 includes a substantially Y-shaped optical waveguide and an optical wavelength filter disposed in one branch of the optical waveguide. An optical filter transmitting light of emission wavelength and blocking light of reception wavelength is used as the optical wavelength filter.

The single-core bidirectional optical communication connector disclosed in PTL 1 includes an optical connector housing having the same structure as the optical connector housing of the two-core optical communication connector used before the single-core bidirectional optical communication connector. That is, the single-core bidirectional optical communication connector includes an optical connector housing having a structure in which the attachment and detachment direction of an optical fiber cable is perpendicular to the direction in which a light-emitting element and a light-receiving element are arranged (includes an optical connector housing having the same basic structure as known in the related art).

PTL 2 and PTL 3 disclose techniques of a single-core bidirectional optical communication module including an optical filter transmitting a first optical signal and reflecting a second optical signal.

In the single-core bidirectional optical communication module disclosed in PTL 2, a light-emitting element and a light-receiving element are arranged so that the optical axes are orthogonal to each other (orthogonal arrangement). The optical filter is disposed at the orthogonal intersection position of two optical axes. The optical filter is disposed at the orthogonal intersection position in a predetermined space by the use of a dedicated component.

The single-core bidirectional optical communication module disclosed in PTL 2 has a problem in that the size of the module including a circuit part (device) increases (whereby the single-core bidirectional optical communication connector also increases in size), since the light-emitting element and the light-receiving element are disposed to be orthogonal to each other. Since the light-emitting element and the light-receiving element are disposed to be orthogonal to each other, there is a problem in that the single-core bidirectional optical communication module cannot be assembled into the optical connector housing having the structure according to the related art. In addition, since the optical filter is disposed at a predetermined position in a predetermined space, a dedicated component is necessary. Since it is also necessary to guarantee an assembly space for the dedicated component, there is also a problem in that the size of the module increases as described above. In order to dispose the optical filter at a predetermined position in a predetermined space, it is necessary to perform a highly-precise positioning process. Accordingly, there is also a problem in that the manufacturing difficulty increases.

The single-core bidirectional optical communication module disclosed in PTL 3 has a structure in which the attachment and detachment direction of the optical fiber cable is parallel to the direction in which a light-emitting element and a light-receiving element are arranged (that is, a structure in which the optical axes of the light-emitting element and the light-receiving element are orthogonal to the optical axis of the optical fiber cable). The single-core bidirectional optical communication module disclosed in PTL 3 includes an optical path changing component (optical member) formed of a resin. The optical filter is fixed to the optical path changing component with an adhesive.

The single-core bidirectional optical communication module disclosed in PTL 3 has a problem in that it cannot be assembled into the optical connector housing having the structure according to the related art. Since the optical filter is bonded to the optical path changing component, there is also a problem in that the optical filter may be destroyed due to the difference in the thermal expansion coefficient between the materials thereof.

CITATION LIST

Patent Literature

[PTL 1] JP-A-2004-138966
[PTL 2] JP-T-2008-512694
[PTL 3] JP-A-2008-225339

SUMMARY OF INVENTION

Technical Problem

The invention is made in consideration of the above-mentioned problems. A goal of the invention is to provide a single-core bidirectional optical communication module and a single-core bidirectional optical communication connector which can decrease in size without greatly changing the structure of the optical connector housing according to the related art.

Solution to Problem

According to a first embodiment of the invention, there is provided an optical communication module comprising:

an optical fiber cable;

a first optical element disposed so that an optical axis thereof is substantially parallel to an optical axis of the optical fiber cable, and configured to transmit or receive a first optical signal;

a second optical element disposed so that an optical axis thereof is substantially parallel to the optical axis of the optical fiber cable, and configured to transmit or receive a second optical signal;

an optical path changing component disposed between the optical fiber cable and the second optical element; and an optical filter disposed between the optical fiber cable and the first optical element, and configured to transmit the first optical signal and to reflect the second optical signal, wherein the optical path changing component and the optical filter twice bend an optical path of the second optical signal by 90° every time.

Preferably, the optical path changing component is formed of a resin.

Preferably, the first and second optical elements are disposed on a plane of a circuit and the optical axis of the optical fiber cable is perpendicular to the plane.

According to the first embodiment of the invention having these features, the optical communication module can be assembled into an optical connector housing having a structure in which the attachment and detachment direction of the optical fiber cable is orthogonal to the direction in which the light-emitting element and the light-receiving element are arranged (which will be described in detail in the Description of Embodiments). According to this embodiment, it is possible to reduce the size of the optical path part of the optical path changing component by twice bending the optical path of the second optical signal by 90 every time by the use of the optical path changing component. According to this embodiment, by twice bending the optical path of the second optical signal, it is possible to mount the light-emitting element and the light-receiving element on the same plane of the circuit board so as to be adjacent to each other. Accordingly, it is possible to achieve the decrease in size.

According to a second embodiment of the invention, the optical communication module according to the first embodiment further includes an optical filter mounting portion formed by cutting out a side portion of the optical path changing component, and an optical filter fixing component fixing a position of the optical filter by interposing the optical filter between the optical filter mounting portion and the optical filter fixing component.

According to the second embodiment of the invention having this feature, since the optical filter is directly mounted on the optical path changing component, it is possible to simplify the positioning process for mounting the optical filter. According to this embodiment, since the optical filter mounting portion is formed by cutting out the side portion of the optical path changing component (since the optical filter mounting portion is formed without causing the optical path changing component to protrude), it is possible to achieve the decrease in size of the module. According to this embodiment, since the optical filter is interposed between the optical filter mounting portion and the optical filter fixing component, it is possible to loosen the stress due to the difference in thermal expansion coefficient between the optical filter and the optical path changing component at the time of variation in temperature, thereby preventing the destruction or peeling of the optical filter.

According to a third embodiment of the invention, in the optical communication module according to the first or second embodiment, a sleeve guiding a ferrule at an end of the optical fiber cable is integrated with the optical path changing component.

According to the third embodiment of the invention having this feature, since the positioning of the ferrule at the terminal of the optical fiber cable can be performed by the use of the sleeve of the optical path changing component, it is possible to simplify the structure of the optical connector housing which is an assembly destination of the single-core bidirectional optical communication module.

According to a fourth embodiment of the invention, in the optical communication module according to any one of the first to third embodiments, a through-hole communicating with a space in which the optical elements are present in a state where the optical path changing component and the optical transceiver circuit unit are fixed is formed in the optical path changing component and a protective resin is injected into the space through the through-hole.

The optical communication module preferably includes a component closing the through-hole.

According to the fourth embodiment of the invention having this feature, for example, when a dispenser needle is inserted into the through-hole, the protective resin is injected into the space in which the optical elements are present, and the injected protective resin is cured, various components or bonding wires in the optical transceiver circuit unit are covered with the protective resin without being exposed to the space. By forming the through-hole and injecting the protective resin, it is possible to protect various components or bonding wires in the optical transceiver circuit unit. According to this embodiment, it is possible to close the through-hole by the use of the component closing the through-hole, after the protective resin is injected into the space in which the optical elements are present. By clogging the through-hole, it is possible to avoid the intrusion of particles and the like. An example of the component closing the through-hole corresponds to an optical face protective component 28 (see a sixth embodiment) to be described later.

According to a fifth embodiment of the invention, there is provided an optical communication connector including: the optical communication module according to any one of the first to fourth embodiments; and an optical connector housing accommodating the optical communication module so that the optical axis of the optical fiber cable is substantially perpendicular to the circuit of the optical communication module.

According to the fifth embodiment of the invention having this feature, it is possible to provide a single-core bidirectional optical communication connector which can decrease in size without greatly changing the structure of the optical connector housing according to the related art.

Advantageous Effects of Invention

According to the first embodiment of the invention, it is not necessary to greatly change the structure of the optical connector housing which is an assembly destination of the single-core bidirectional optical communication module, compared with the structure of the past optical connector housing. According to the invention, it is possible to reduce the size of the module.

According to the second embodiment of the invention, it is possible to simplify the positioning process for mounting the optical filter and to achieve the decrease in size of the module, by employing the structure of the optical path changing component. According to the invention, since the optical filter is interposed between the optical filter mounting portion of the optical path changing component and the optical filter fixing component, it is possible to loosen the stress due to the difference in thermal expansion coefficient between the optical filter and the optical path changing component at the time of variation in temperature, thereby preventing the destruction or peeling of the optical filter.

According to the third embodiment of the invention, by integrating the sleeve with the optical path changing component, it is possible to simplify the structure of the optical connector housing which is an assembly destination of the single-core bidirectional optical communication module. According to the invention, it is possible to improve the optical coupling state.

According to the fourth embodiment of the invention, by injecting the resin into the space in which the optical elements are present through the through-hole, it is possible to cover various components or bonding wires in the optical transceiver circuit unit with the protective resin without being exposed to the space, thereby protecting the components or bonding wires. According to the invention, it is possible to prevent the deterioration or detachment of components and the peeling of the bonding wires due to the influence of humidity or the vibration in use or the like. In addition, according to the invention, since the protective resin is injected into the space in which the optical elements are present in the state where the optical path changing component and the optical transceiver circuit unit are fixed, it is possible to gather the protective resin in the space and thus to make planar the surface of the protective resin covering the optical elements. Accordingly, it is possible to facilitate the optical design including the protective resin. By closing the through-hole, it is possible to prevent the intrusion of particles or the like through the through-hole.

According to the fifth embodiment of the invention, it is possible to provide a single-core bidirectional optical communication connector which can decrease in size without greatly changing the structure of the past optical connector housing.

DESCRIPTION OF EMBODIMENTS

A single-core bidirectional optical communication module includes an optical transceiver circuit unit in which a light-emitting element and a light-receiving element are arranged in parallel and an optical path changing component in which the optical axis of an optical fiber cable is substantially perpendicular to the optical transceiver circuit unit. In other words, the optical path changing component has a structure in which the attachment and detachment direction of the optical fiber cable is perpendicular to the optical transceiver circuit unit.

A single-core bidirectional optical communication connector includes the single-core bidirectional optical communication module and an optical connector housing that houses the single-core bidirectional optical communication module so that the optical axis of the optical fiber cable is substantially perpendicular to the optical transceiver circuit unit.

First Embodiment

Figure 1:
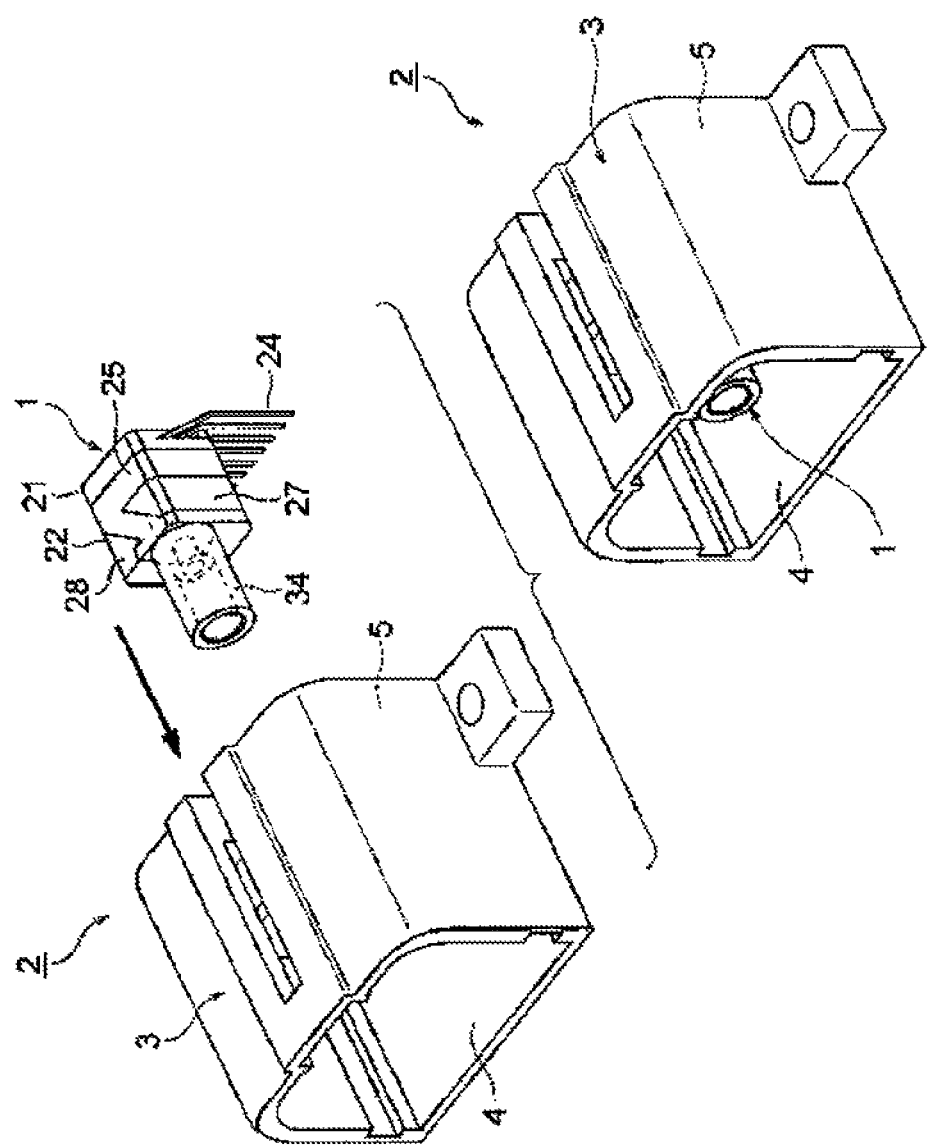
FIG. 1 is a perspective view illustrating a single-core bidirectional optical communication module and a single-core bidirectional optical communication connector according to a first embodiment of the invention.
Figure 2:
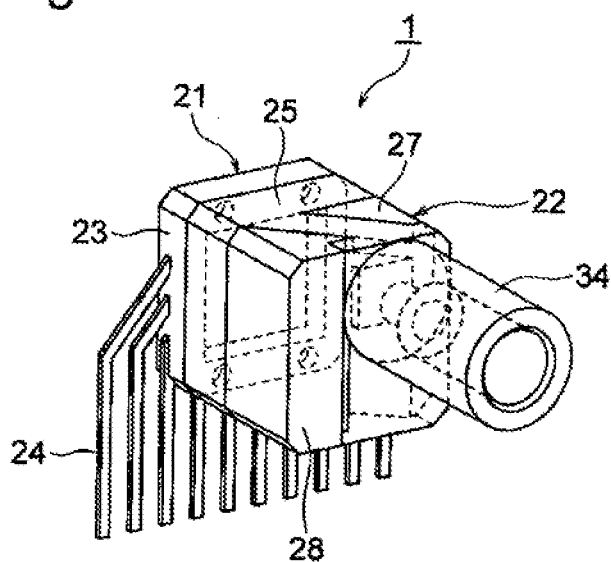
FIG. 2 is a perspective view illustrating the single-core bidirectional optical communication module.
Figure 3:
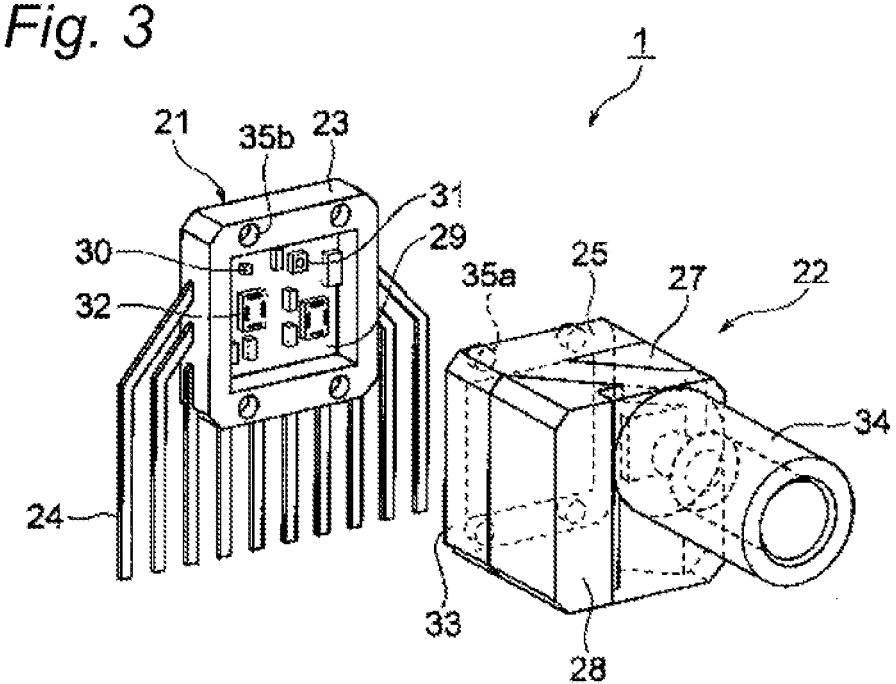
FIG. 3 is a perspective view illustrating an optical transceiver circuit unit and an optical unit.
Figure 4:
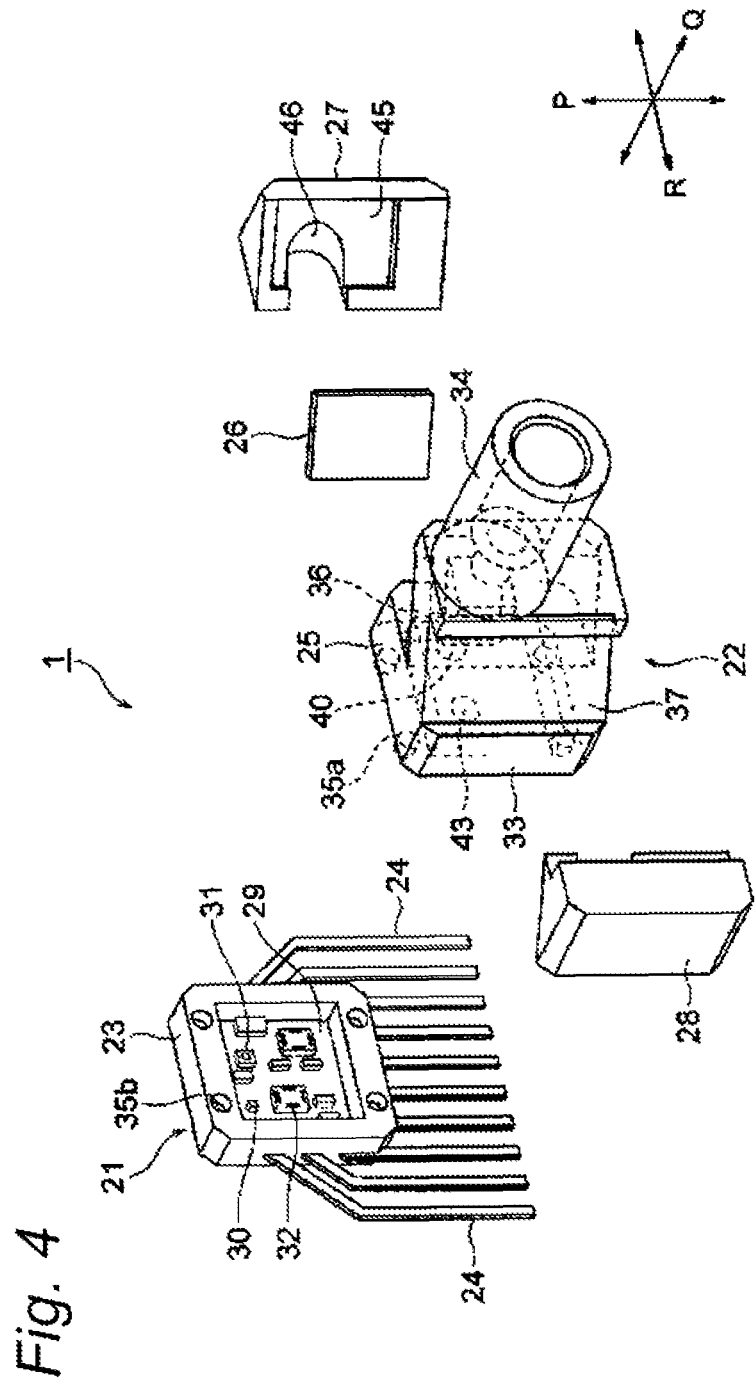
FIG. 4 is an exploded perspective view illustrating the single-core bidirectional optical communication module.
Figure 5:
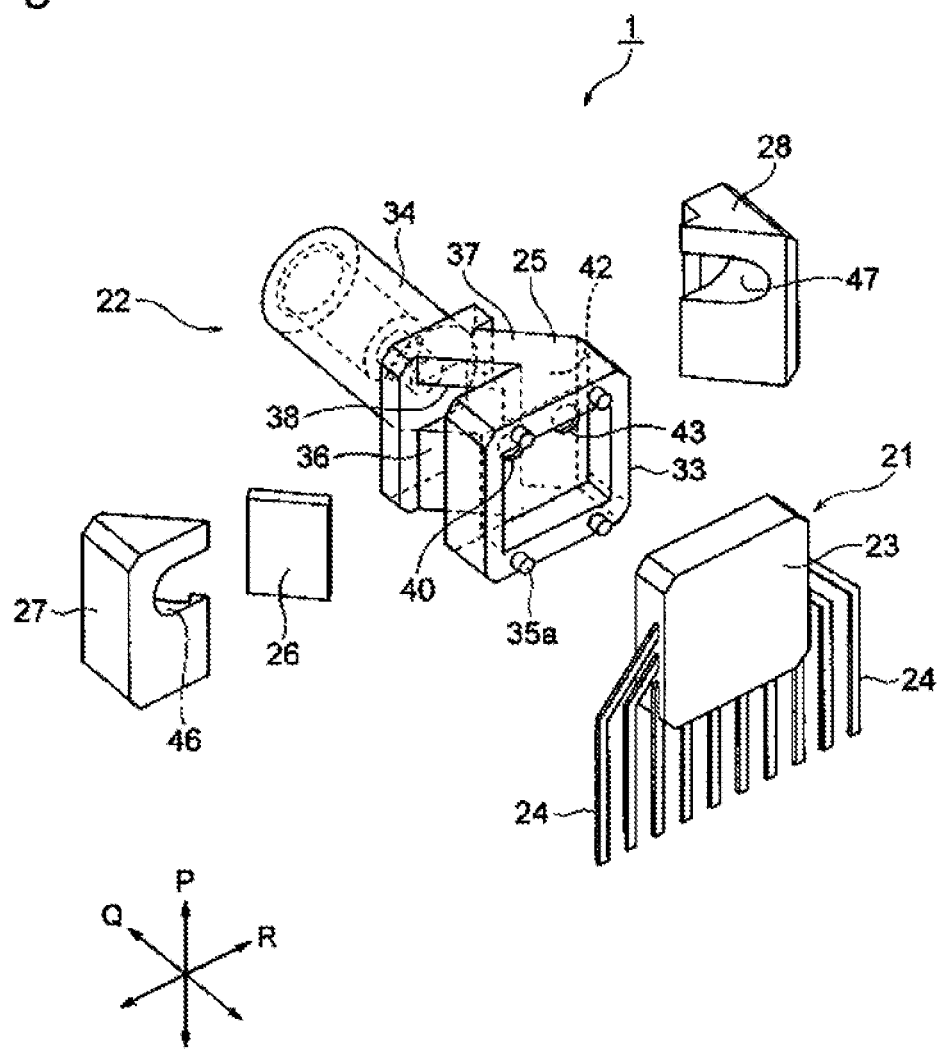
FIG. 5 is an exploded perspective view illustrating the single-core bidirectional optical communication module as seen from an angle different from that in FIG. 4.
Figure 6:
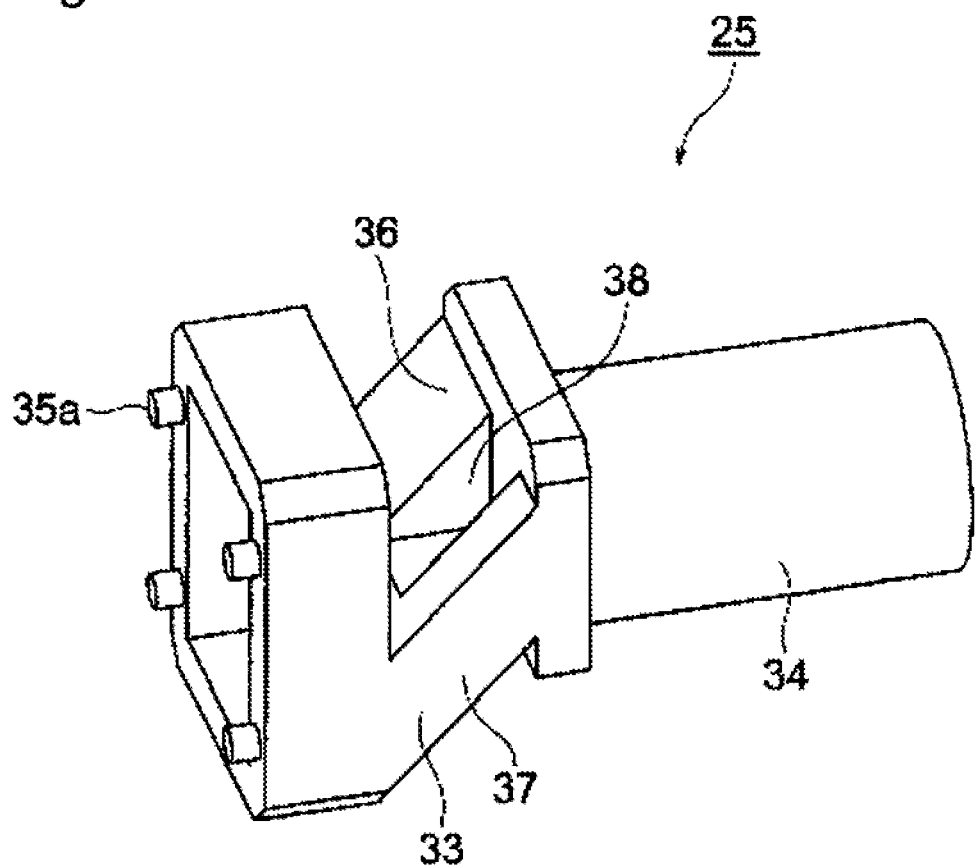
FIG. 6 is a perspective view of an optical path changing component.
Figure 7:
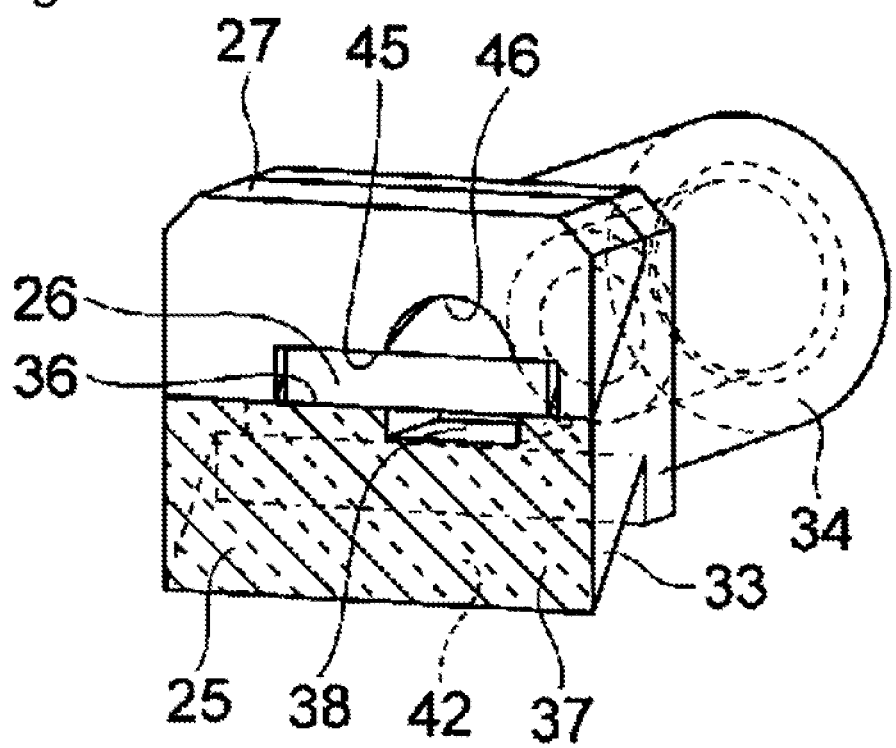
FIG. 7 is a sectional view of the optical unit in a state where an optical filter is mounted thereon.
Figure 8:
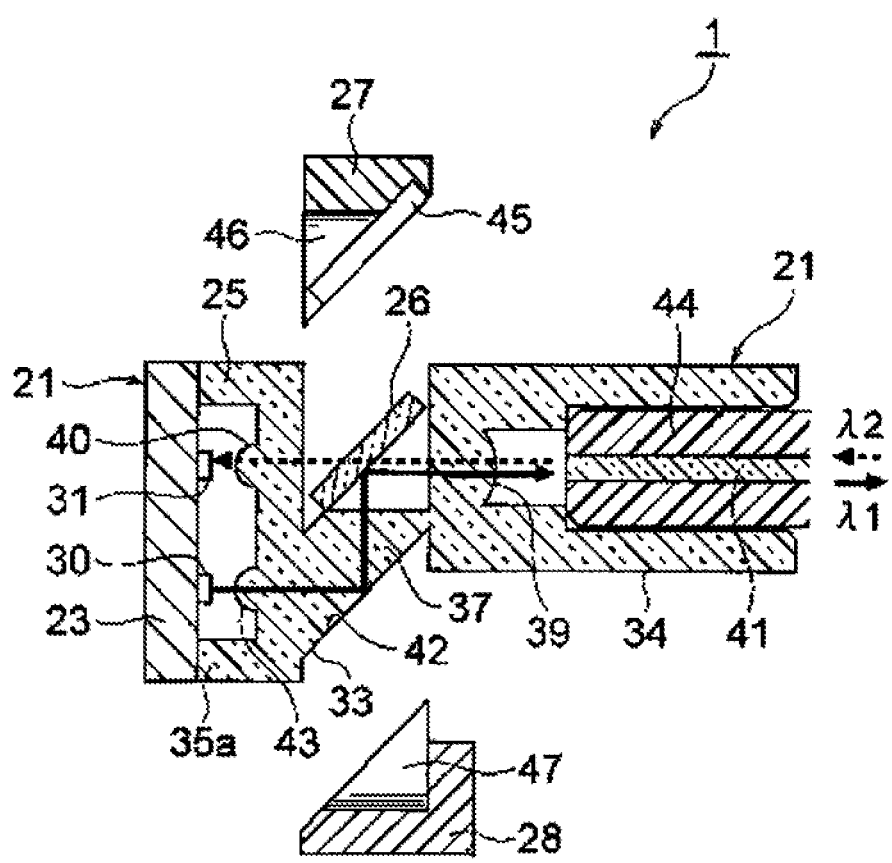
FIG. 8 is a sectional view of a module illustrating optical paths for transmission ($\lambda 1$) and reception ($\lambda 2$).
Figure 9:
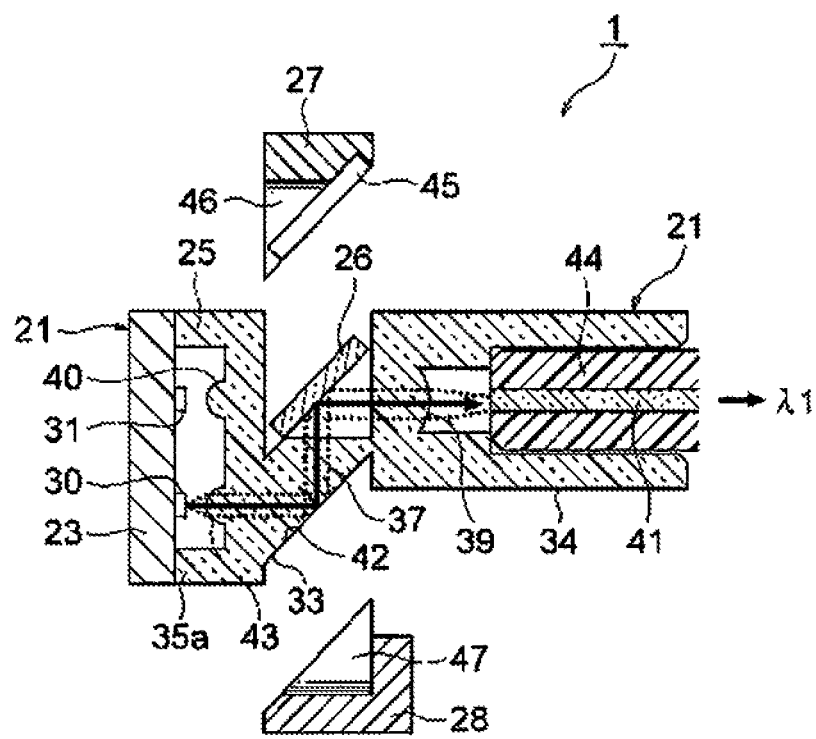
FIG. 9 is a sectional view of a module illustrating the optical path of transmission ($\lambda 1$).
Figure 10:
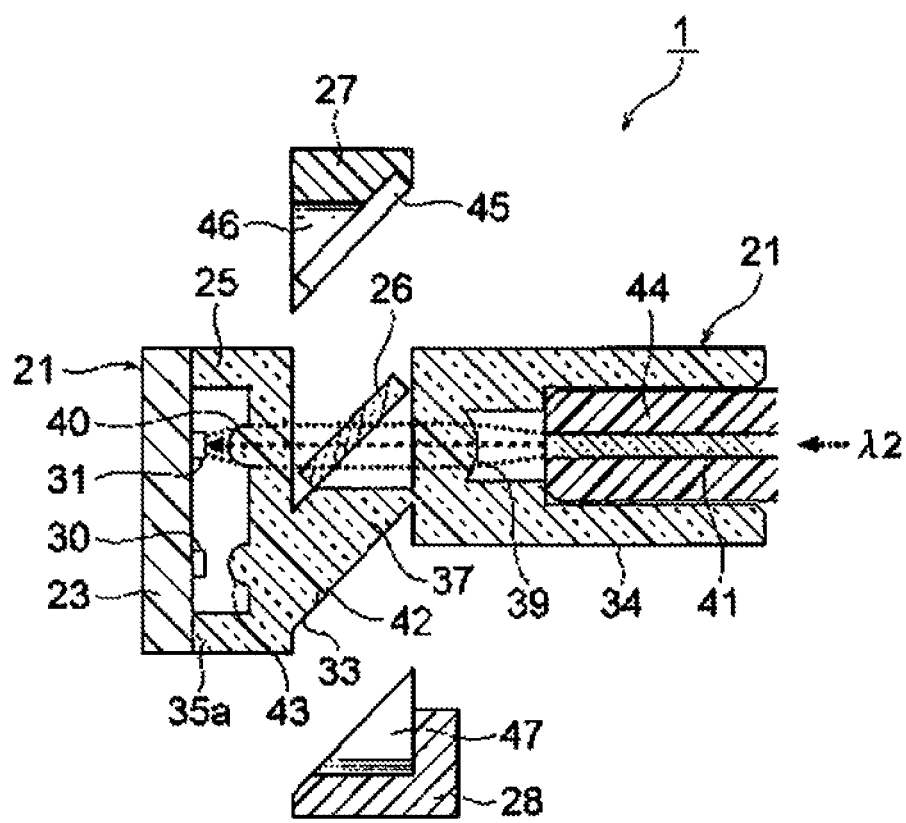
FIG. 10 is a sectional view of a module illustrating the optical path of reception ($\lambda 2$).

Hereinafter, a first embodiment of the invention will be described with reference to the accompanying drawings. FIG. 1 is a diagram illustrating a single-core bidirectional optical communication module and a single-core bidirectional optical communication connector according to a first embodiment of the invention. FIG. 2 is a perspective view of the single-core bidirectional optical communication module, FIG. 3 is a perspective view of the optical transceiver circuit unit and an optical unit, FIGS. 4 and 5 are exploded perspective views of the single-core bidirectional optical communication module, FIG. 6 is a perspective view of the optical path changing component, FIG. 7 is a sectional view of the optical unit in a state where an optical filter mounted thereon, and FIGS. 8 to 10 are sectional views of a module illustrating an optical path.

In FIG. 1, reference numeral 1 represents a single-core bidirectional optical communication module according to the invention. Reference numeral 2 represents a single-core bidirectional optical communication connector according to the invention. The single-core bidirectional optical communication connector 2 includes an optical connector housing 3 formed of an insulating synthetic resin and a shield case not shown. The optical connector housing 3 is mounted with the single-core bidirectional optical communication module 1.

The optical connector housing 3 includes a connector insertion portion 4 into which the opposite optical communication connector (optical connector) is inserted on the front side thereof. The optical connector housing 3 includes a mounting portion 5 on which the single-core bidirectional optical communication module 1 is mounted on the rear side thereof. The optical connector housing 3 basically has the same structure as the past two-core optical connector housing.

The single-core bidirectional optical communication module 1 is mounted on the optical connector housing 3 in the arrow direction. The single-core bidirectional optical communication module 1 will be described below.

As shown in FIGS. 2 to 5, the single-core bidirectional optical communication module 1 includes the optical transceiver circuit unit 21 and the optical unit 22. The optical transceiver circuit unit 21 includes a circuit unit body 23 and plural lead frames 24 extending from the circuit unit body 23. On the other hand, the optical unit 22 includes an optical path changing component 25, an optical filter 26, an optical path changing component 27, and an optical face protecting component 28.

The circuit unit body 23 includes a circuit board 29 formed of an insulator substrate hard and inflexible, a light-emitting element 30, a light-receiving element 31, and a driving circuit 32 driving the optical elements. The light-emitting element 30 and the light-receiving element 31 are mounted on the same plane of the circuit board 29 so as to be adjacent to each other. The reception light and transmission light are perpendicularly input to and output from the circuit board 29. Two wavelengths ($\lambda 1/\lambda 2$) are used for the transmission/reception light (the opposite optical communication module employs transmission/reception wavelengths of $\lambda 2/\lambda 1$), the light-emitting element 30 and the light-receiving element 31 corresponding to the wavelengths are used in this embodiment.

In this embodiment, a VCSEL (Vertical Cavity Surface Emitting Laser) (with emission wavelengths of $\lambda 1$=850 nm and $\lambda 2$=780 nm) is used as the light-emitting element 30. An Si-PIN photodiode (which is an example) is used as the light-receiving element 31. The plural lead frames 24 are inserted into a circuit board not shown and serving as a mounting destination of the single-core bidirectional optical communication connector 2 and is soldered to a predetermined circuit.

Here, the direction of arrow P is defined as a vertical direction, the direction of arrow Q is defined as a front-rear direction, and the direction of arrow R is defined as a right-left direction (see FIGS. 4 and 5).

The optical path changing component 25 is a molded component formed of a transparent resin (such as epoxy, cycloolefin, PMMA, and PC) and includes a component body 33 and a sleeve 34 integrated with the front end of the component body 33. In the optical path changing component 25, an optical part for transmission (a part coupling transmission light from the light-emitting element 30 to the optical fiber cable), an optical part for reception (a part coupling reception light from the optical fiber cable to the light-emitting element 31), and the sleeve 34 are integrated with each other (it is preferable that the sleeve 34 is integrated, but may be disposed independently, that is, the function of the sleeve 34 may be given to the optical connector housing 3).

The component body 33 is fixed to the circuit unit body 23 of the optical transceiver circuit unit 21. Specifically (although not limited thereto), protrusions 35*a* are formed at the rear end. Holes 35*b* are formed in the circuit unit body 23. For example, when the rear end is inserted into the circuit unit body 23 in the state where an adhesive is applied to the contact surfaces thereof, the fixation thereof is completed.

An optical filter mounting portion 36 and a prism 37 are formed on both sides of the component body 33. The optical filter mounting portion 36 and the prism 37 are formed to cut out the side portions. The component body 33 has a substantially Z shape (is formed in a substantially Z shape by the cutouts) as seen from the upside. The optical filter mounting portion 36 is formed to be mounted with the optical filter 26 with an inclination of 45°. A cut through-hole 38 is formed in the optical filter mounting portion 36 (see FIGS. 6 and 7). The cut through-hole 38 is formed to penetrate the slope by cutting a slope of the optical filter mounting portion 36 corresponding to the center of the optical filter 26.

The optical path changing component 25 includes lenses 39 and 40 on the front and rear sides of the cut through-hole 38. The lenses 39 and 40 are formed in a convex lens shape. The lens 39 is disposed to protrude into the sleeve 34 and the lens 40 is disposed to protrude from the rear end of the component body 33. The lenses 39 and 40 are disposed in positional correspondence with the optical fiber cable 41 (see FIG. 8) and the light-receiving element 31 in this embodiment.

The prism 37 is formed as a part bending the optical signal by 90°. The optical signal bent by 90° by the prism 37 is reflected by the optical filter 26 and is bent by 90°. Reference numeral 42 in the prism 37 represents a 45° prism face. The 45° prism face 42 is a reflecting face having an inclination of 45° and is formed in contact with external air (air) (another example will be described in a third embodiment). A lens 43 is formed at the rear end of the component body 33 to protrude in positional correspondence with the prism 37. The lens 43 has a convex lens shape and is disposed to face the light-emitting element 30.

The sleeve 34 is formed as a cylindrical part. The sleeve 34 serves to guide a ferrule 44 at an end of an optical fiber cable 41 shown in FIG. 8. When the ferrule 44 is guided by the sleeve 34, the end face of the optical fiber cable 41 is separated from the lens 39 by a predetermined distance. In this embodiment, the optical fiber cable 41 employs a PCS (Polymer Clad Silica) (with a core diameter of $\phi 200$ μm and a clad diameter of $\phi 230$ μm) (which is an example).

The optical filter 26 serves to transmit a first optical signal and to reflect a second optical signal, and transmits the reception light and reflects the transmission light in this embodiment. The optical filter 26 employs a dielectric multilayered filter (with BK7 as a substrate).

In FIGS. 2 to 5 and FIG. 7, the optical filter fixing component 27 interposes the optical filter 26 in cooperation with the optical filter mounting portion 36 of the optical path changing component 25 so as to fix the position of the optical filter 26. The optical filter fixing component 27 is inserted into a cutout portion in the side of the component body 33 and is fixed thereto by any one of bonding, welding, and pressing (it is assumed that the optical filter 26 is neither bonded nor welded). A concave portion 45 into which the optical filter 26 is inserted and a cut through-hole 46 are formed in the optical filter fixing component 27. The cut through-hole 46 is formed to penetrate the slope of the concave portion 45 by cutting out the slope of the concave portion corresponding to the center of the optical filter 26.

In FIGS. 2 to 5, the optical face protecting component 28 is provided to protect the 45° prism face 42 of the optical path changing component 25 and to prevent it from contamination. The optical face protecting component 28 is inserted into the cutout portion in the side of the component body 33 and is fixed thereto by any one of bonding, welding, and pressing. A cut through-hole 47 is formed in the optical face protecting component 28. The cut through-hole 47 is formed to penetrate the optical face protective component by cutting out the part corresponding to the center of the prism 37 transmitting/ reflecting the optical signals. The cut through-hole 47 has such as shape not to damage the 45° prism face 42.

In the above-mentioned configuration and structure, when the optical filter 26 is first placed on the optical filter mounting portion 36 of the optical path changing component 25 and then the optical filter 26 is interposed between the optical filter mounting portion 36 and the optical filter fixing component 27, the state shown in FIG. 7 is achieved. The optical filter 26 is fixed by simple insertion, not by bonding and the like.

When the optical filter 26 is fixed with an adhesive as in the related art, the following process may be caused. That is, when the optical filter 26 formed of glass (such as BK7) or ceramic having a small thermal expansion coefficient is fixed to the optical filter mounting portion 36 of the optical path changing component 25 formed of a transparent resin (such as epoxy, cycloolefin, PMMA, and PC) having a large thermal expansion coefficient by bonding, a problem that the optical filter 26 may be destroyed or the optical filter 26 may be peeled off from the optical filter mounting portion 36 may be caused by the stress due to the difference in thermal expansion coefficient (the difference is about 100 times) with a variation in temperature. In the invention, since the optical filter 26 is fixed by insertion, not by bonding, the stress with the variation in temperature can be loosened. According to the invention, it is possible to prevent the deterioration in characteristics of the optical filter 26 due to the peeling or the destruction of the optical filter 26.

When the optical fact protecting component 28 is fixed to the optical path changing component 25 so as to protect the 45° prism face 42 of the optical path changing component 25, the state shown in FIG. 3 is achieved and thus the optical unit 22 is formed. Thereafter, when the optical unit 22 is fixed to the circuit unit body 23 of the optical transceiver circuit unit 21, the single-core bidirectional optical communication module 1 shown in FIG. 2 is completely assembled.

The optical path of the single-core bidirectional optical communication module 1, more specifically, the optical path for transmission and the optical path for reception will be described below. The optical path for transmission will be described with reference to FIGS. 8 and 9 and the optical path for reception will be described with reference to FIGS. 8 and 10.

In FIGS. 8 and 9, the light emitted from the light-emitting element 30, that is, the transmission light, is changed to parallel light by the lens 43 disposed just above the light-emitting element 30, is input to the prism 37, and is totally reflected by the 45° prism face 42 having an inclination of 45°, whereby the optical path is bent upward by 90°. Thereafter, the transmission light is reflected by the optical filter 26 disposed with an inclination of 45°, is further bent by 90°, and is condensed by the lens 39 close to the optical fiber cable 41. The transmission light is coupled to the optical fiber cable 41 (The optical filter 26 has a characteristic of reflecting the transmission light (with a wavelength of λ1) and transmitting the reception light (with a wavelength of λ2). The return light of the transmission light (with a wavelength of λ1) reflected by the end face (the proximal end and the distal end) of the optical fiber cable 41 is reflected by the optical filter 26 so as not to enter the light-receiving element 31. Accordingly, it is possible to prevent the "communication interference (crosstalk)" that the module receive its own transmission light.).

In FIGS. 8 and 10, the light emitted from the optical fiber cable 41, that is, the reception light, is changed to parallel light by the lens 39 close to the optical fiber cable 41 and is then transmitted by the optical filter 26 disposed with an inclination of 45°. Then the light is condensed by the lens 40 disposed just above the light-receiving element 31 and is coupled to the light-receiving element 31.

As described with reference to FIGS. 1 to 10, according to the invention, the single-core bidirectional optical communication module 1 can be assembled into the optical connector housing 3 having a structure in which the attachment and detachment direction of the optical fiber cable 41 is perpendicular to the direction in which the light-emitting element 30 and the light-receiving element 31 are arranged. Accordingly, it is not necessary to greatly change the structure, compared with the structure of the past optical connector housing.

According to the invention, since the optical path of the transmission light (with a wavelength of λ1) are twice bent by 90° by the optical path changing component 25, it is possible to reduce the size of the optical path part of the optical path changing component 25 and thus to achieve the decrease in size of the single-core bidirectional optical communication module 1 or the single-core bidirectional optical communication connector 2.

According to the invention, since the optical path of the optical communication (with a wavelength of λ1) is twice bent by 90°, it is possible to mount the light-emitting element 30 and the light-receiving element 31 on the same plane of the circuit board 29 so as to be adjacent to each other. Accordingly, it is possible to achieve the decrease in size of the single-core bidirectional optical communication module 1 or the single-core bidirectional optical communication connector 2.

According to the invention, since the optical filter 26 is directly mounted on the optical path changing component 25, it is possible to simplify the positioning process for mounting the optical filter, compared with the related art.

According to the invention, since the side portion of the optical path changing component 25 is cut out to form the optical filter mounting portion 36, it is possible to reduce the module size. Accordingly, it is possible to achieve the decrease in size of the single-core bidirectional optical communication module 1 or the single-core bidirectional optical communication connector 2.

According to the invention, since the optical filter 26 is interposed between the optical filter mounting portion 36 and the optical filter fixing component 27, it is possible to loosen the stress due to the difference in thermal expansion coefficient between the optical filter 26 and the optical path changing component 25 with the variation in temperature and to prevent the destruction or the peeling of the optical filter 26.

Second Embodiment

Figure 11:
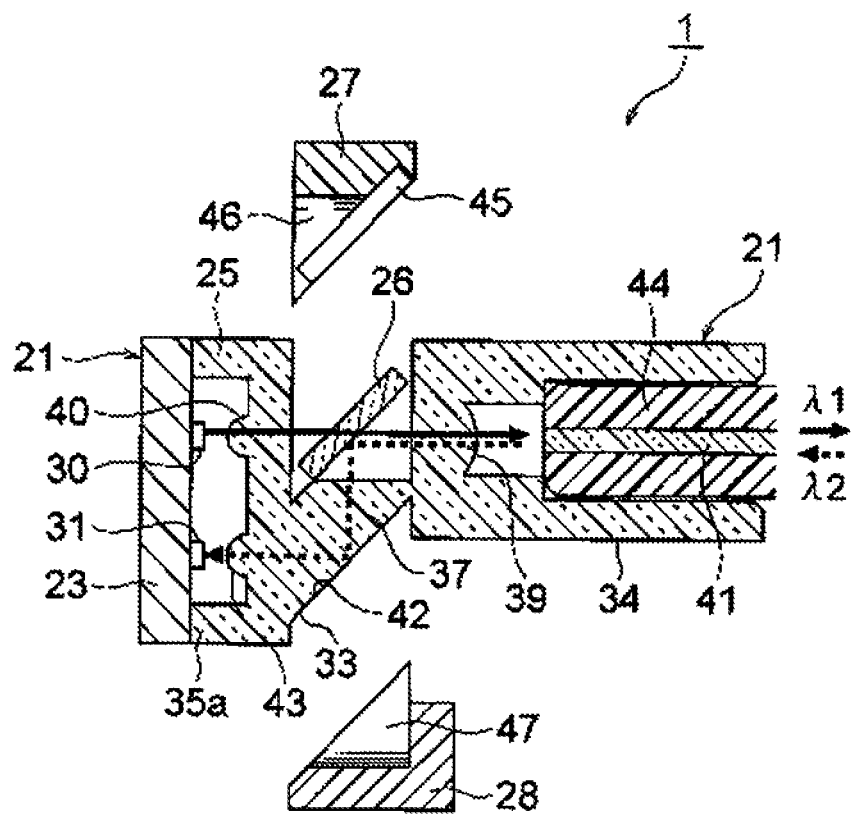
FIG. 11 is a sectional view of a module illustrating optical paths for transmission ($\lambda 1$) and reception ($\lambda 2$) according to another embodiment.

A second embodiment of the invention will be described below with reference to the accompanying drawings. FIG. 11 is a sectional view of a module illustrating the optical paths for transmission (λ1) and reception (λ2). The same constituent elements as the first embodiment are referenced by the same reference numerals and detailed description thereof is not repeated.

As shown in FIG. 11, the arrangement of the light-emitting element 30 and the light-receiving element 31 in the second embodiment is opposite to the first embodiment (the positions are exchanged). The transmission light from the light-emitting element 30 is transmitted by the optical filter 26 and is then coupled to the optical fiber cable 41. On the other hand, the reception light from the optical fiber cable 41 is reflected and bent by 90° by the optical filter 26 and is then bent by 90° again by the 45° prism face 42. Then the reception light is coupled to the light-receiving element 31 (the optical filter 26 has a characteristic of transmitting the transmission light (with a wavelength of λ1) and reflecting the reception light (with a wavelength of λ2)). The second embodiment can achieve the same advantages as the first embodiment.

Third Embodiment

Figure 12:
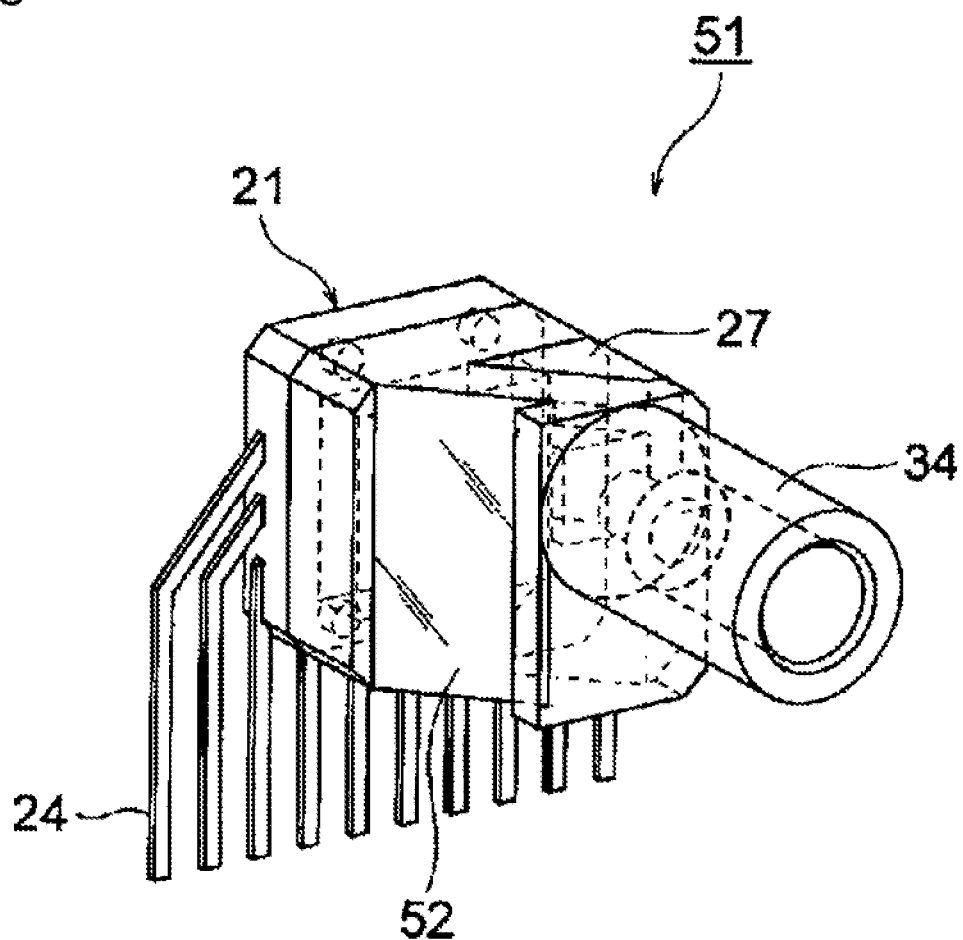
FIG. 12 is a perspective view illustrating a single-core bidirectional optical communication module according to another embodiment (in which a mirror is formed at the position of a 45° prism face).

A third embodiment of the invention will be described below with reference to the accompanying drawings. FIG. 12 is a sectional view of a single-core bidirectional optical communication module. The same constituent elements as the first embodiment are referenced by the same reference numerals and detailed description thereof is not repeated.

In FIG. 12, the single-core bidirectional optical communication module 51 according to the third embodiment does not include the optical face protecting component 28 (see FIG. 2) included in the first embodiment but has a mirror 52 disposed at the position of the 45° prism face 42. The mirror 52 is formed by "electroless plating" or "deposition of a conductive multi-layered film". The third embodiment is an example which is designed to make the optical face protecting component 28 unnecessary, and thus the optical filter 26 may be mounted to bend the optical path by 90°.

Fourth Embodiment

Figure 13:
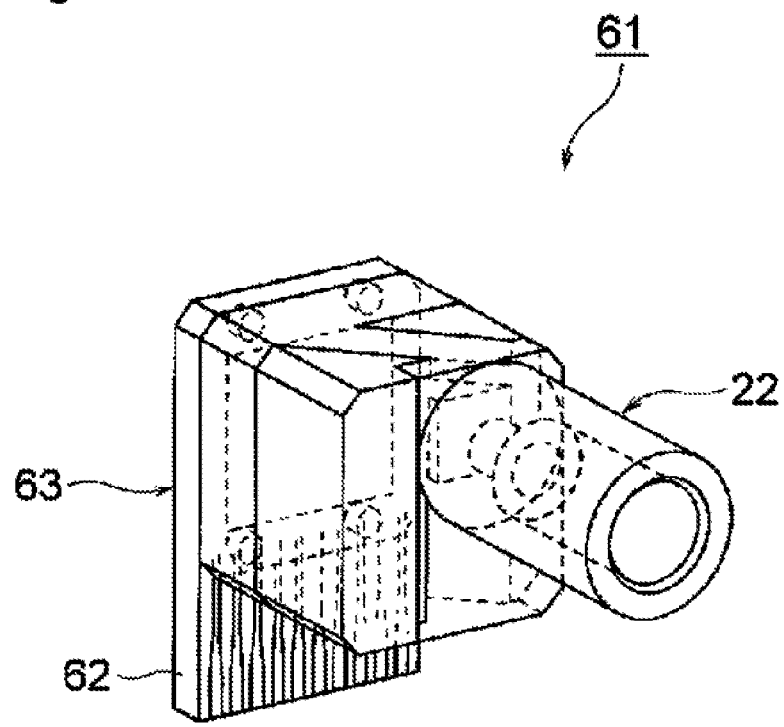
FIG. 13 is a perspective view illustrating a single-core bidirectional optical communication module according to another embodiment (the optical transceiver circuit unit having a rigid board).

A fourth embodiment of the invention will be described below with reference to the accompanying drawings. FIG. 13 is a sectional view of a single-core bidirectional optical communication module according to the invention. The same constituent elements as the first embodiment are referenced by the same reference numerals and detailed description thereof is not repeated.

In FIG. 13, the single-core bidirectional optical communication module 61 according to the fourth embodiment includes an optical transceiver circuit unit 63 having a rigid board 62 such as FR-4 or FR-5 shown in the drawing instead of the optical transceiver circuit unit 21 (see FIG. 2) included in the first embodiment.

Fifth Embodiment

Figure 14:
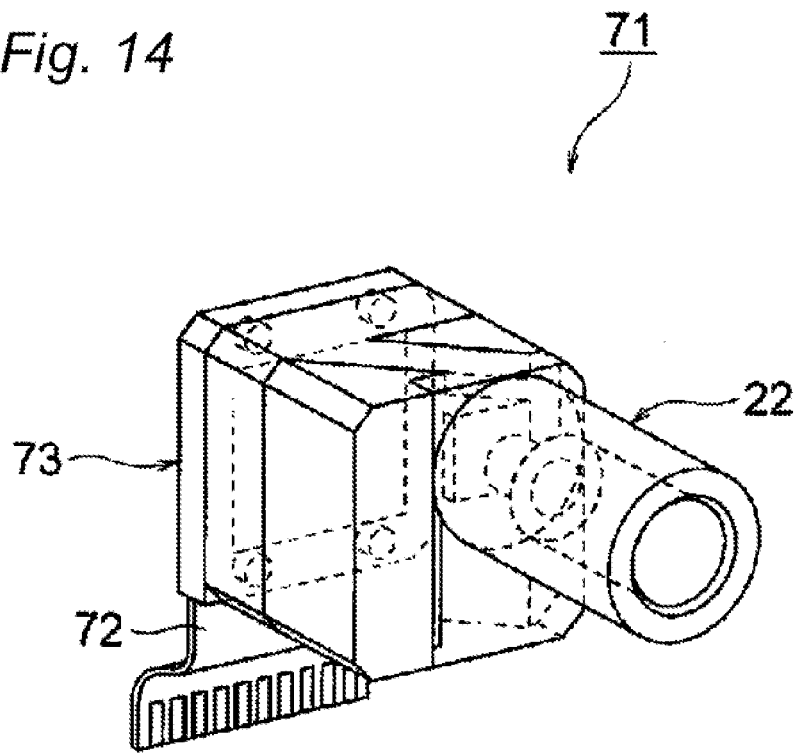
FIG. 14 is a perspective view illustrating a single-core bidirectional optical communication module according to another embodiment (the optical transceiver circuit unit having a flexible rigid board).

A fifth embodiment of the invention will be described below with reference to the accompanying drawings. FIG. 14 is a sectional view of a single-core bidirectional optical communication module according to the invention. The same constituent elements as the first embodiment are referenced by the same reference numerals and detailed description thereof is not repeated.

In FIG. 14, the single-core bidirectional optical communication module 71 according to the fifth embodiment includes an optical transceiver circuit unit 73 having a rigid board 72 shown in the drawing instead of the optical transceiver circuit unit 21 (see FIG. 2) included in the first embodiment.

Sixth Embodiment

A sixth embodiment of the invention will be described below with reference to the accompanying drawings. FIGS. 15 to 19 are diagrams illustrating a single-core bidirectional optical communication module according to another embodiment of the invention. The same constituent elements as the first and fourth embodiments are referenced by the same reference numerals and detailed description thereof is not repeated.

Figure 18:
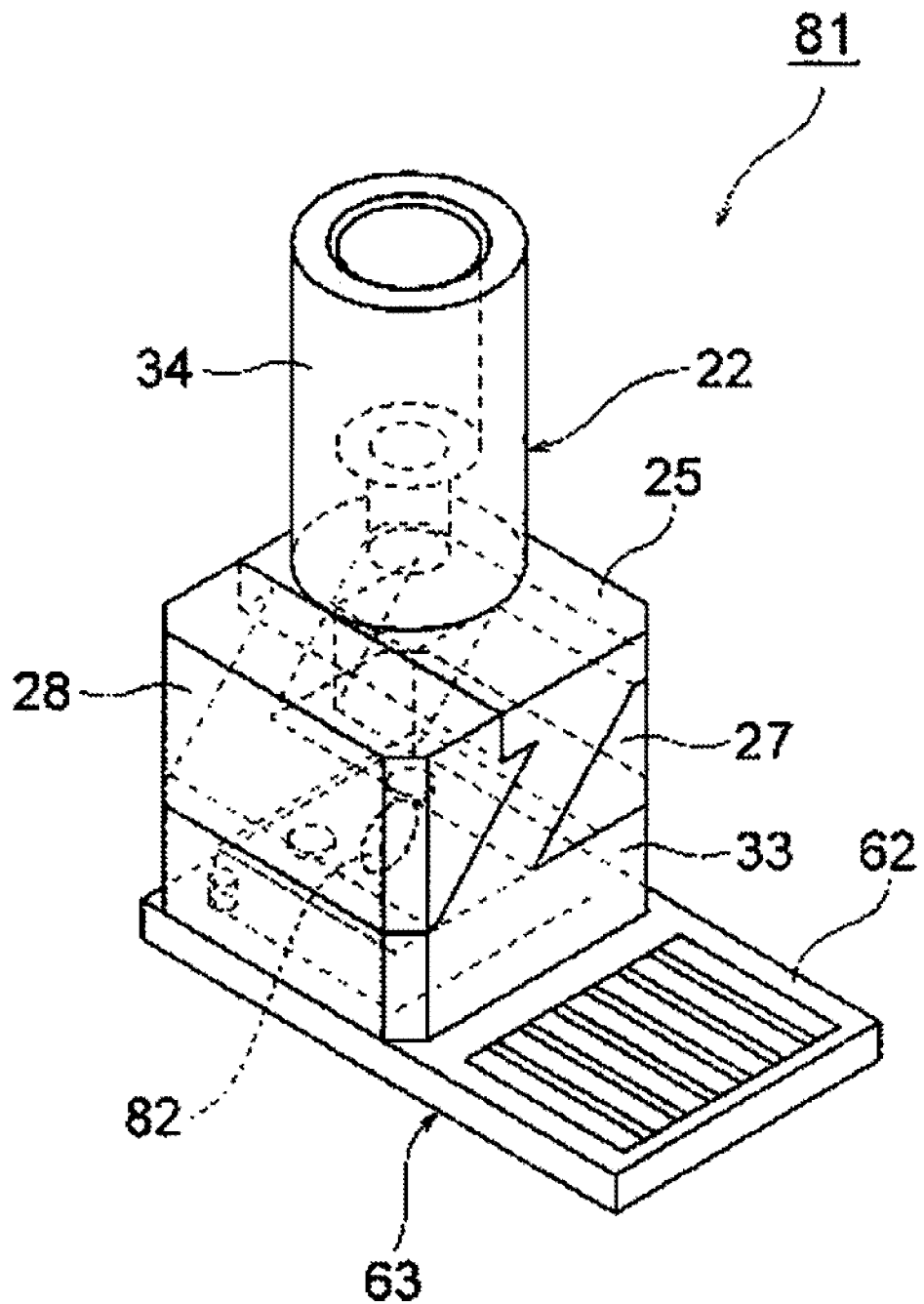
FIG. 18 is a perspective view illustrating a state wherein the single-core bidirectional optical communication module is completely assembled in the state shown in FIG. 17.

In FIG. 18, the single-core bidirectional optical communication module 81 according to a sixth embodiment includes an optical transceiver circuit unit 63 including the rigid board 62 and an optical unit 22 having a through-hole 82 added thereto. The rigid board 62 is mounted with the light-emitting element 30 and the light-receiving element 31 (see FIG. 19). The light-emitting element 30 and the light-receiving element 31 are connected by bonding wires 83 as shown in FIG. 19.

The optical unit 22 includes the optical path changing component 25 having the through-hole 82, the optical filter 26 (see FIG. 17), the optical filter fixing component 27, and the optical face protecting component 28. The through-hole 82 in the optical path changing component 25 is formed in a straight hole from the prism 37 shown in FIG. 15 to the rear end of the component body 33. The through hole 82 is disposed at a position not interfering with the bending of the transmission light or the reception light by 90°. The through-hole 82 communicates with a space 84 in which the light-emitting element 30 and the light-receiving element 31 are present in the state where the optical path changing component 25 and the optical transceiver circuit unit 63 are fixed, as shown in FIG. 19. The space 84 is formed by forming the rear end of the component body 33 in a frame shape in this embodiment. The through-hole 82 has such a size that, for example, a dispenser needle is inserted into the through-hole 82 to inject a liquid protective resin (of which the cured state can be shown by the protective resin 85 in FIG. 19) into the space 84.

Figure 15:
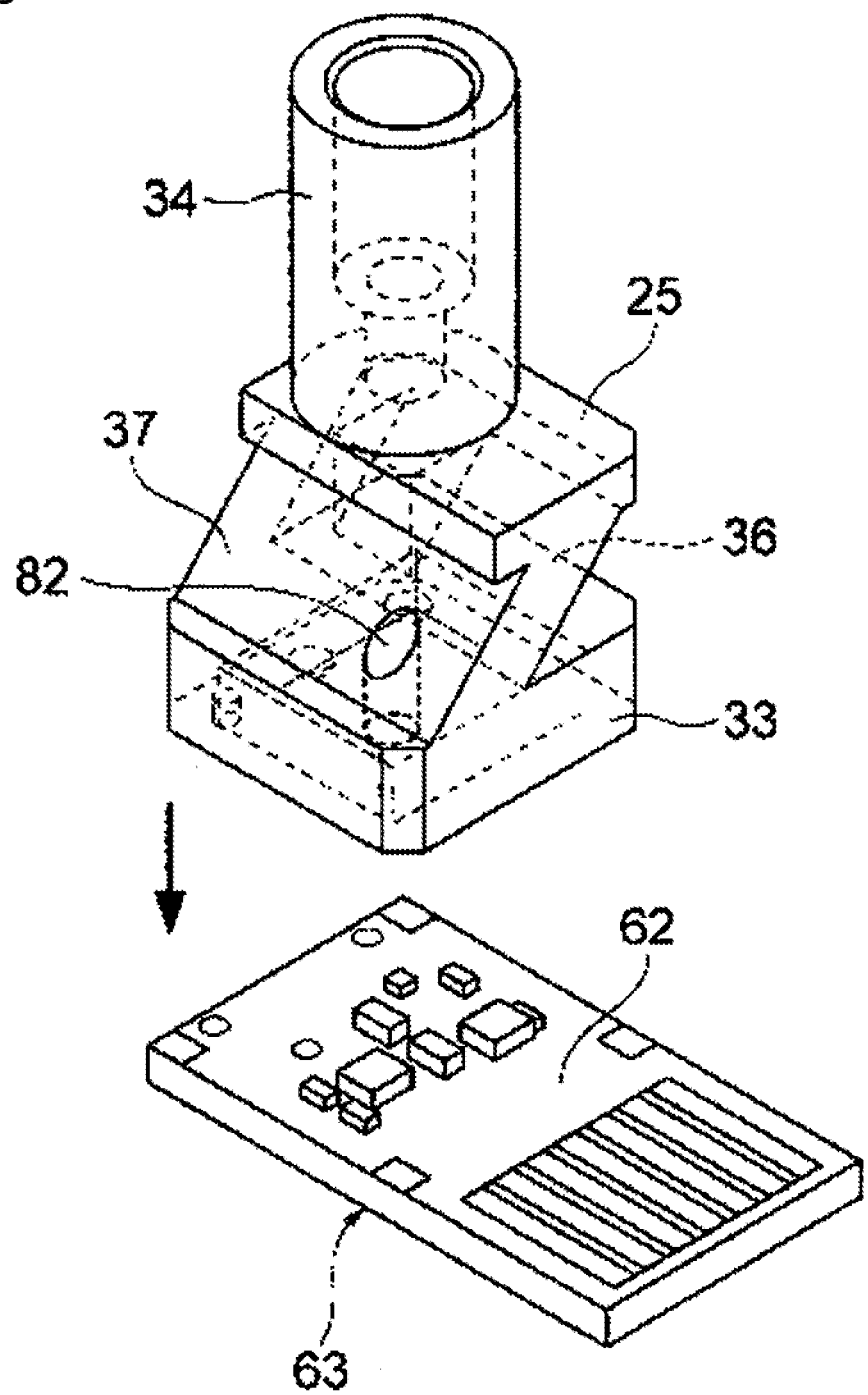
FIG. 15 is a diagram illustrating a single-core bidirectional optical communication module according to another embodiment and is a perspective view of an optical path changing component and an optical transceiver circuit unit.
Figure 16:
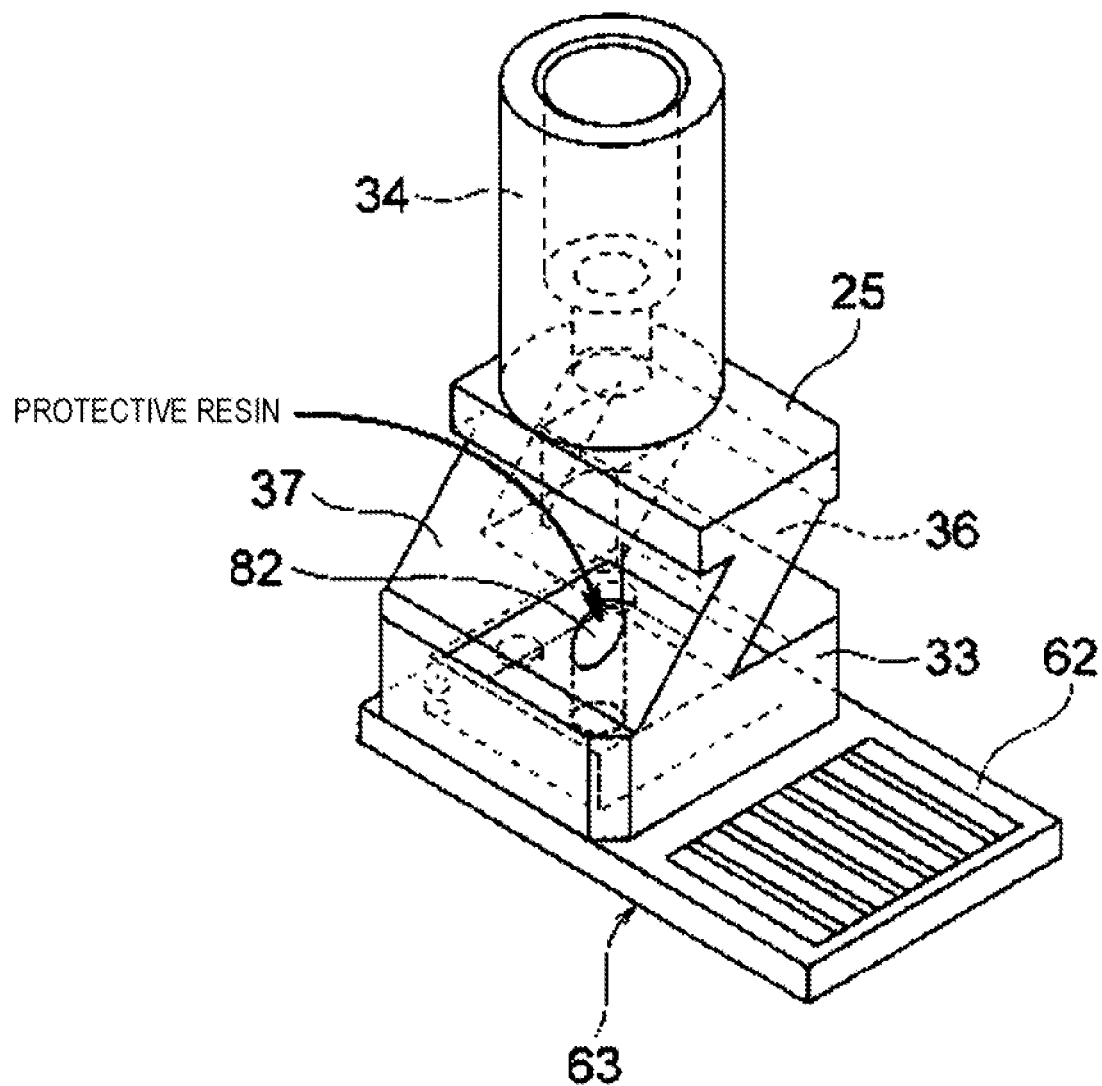
FIG. 16 is a perspective view illustrating a state where the optical path changing component and the optical transceiver circuit unit in the state shown in FIG. 15 are fixed and a protective resin is injected.

In the above-mentioned configuration and structure, the single-core bidirectional optical communication module 81 is assembled as follows. As shown in FIGS. 15 and 16, the optical path changing component 25 is fixed to the optical transceiver circuit unit 63 by the use of a predetermined method such as bonding. Then, as shown in FIG. 16, the protective resin is injected through the through-hole 82 of the optical path changing component 25 fixed to the optical transceiver circuit unit 63. A transparent or fluidic (gel-like) silicon resin is used as the protective resin in this embodiment. The protective resin is injected into the space 84 to such an extent that the light-emitting element 30, the light-receiving element 31, and the like are completely buried, and the resin is then cured to serve as the protective resin 85. The surface of the cured protective resin 85 is a plane 86 (It is possible to facilitate the optical design including the protective resin 85, by making the surface be the plane 86.). The light-emitting element 30, the light-receiving element 31, and the like are covered with and protected by the protective resin 85.

Figure 17:
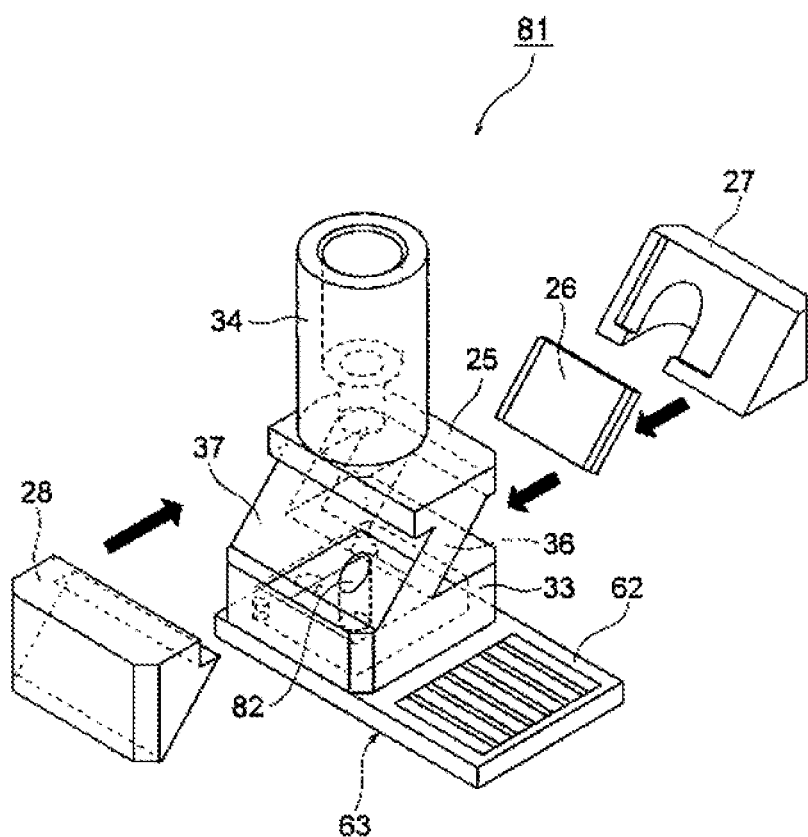
FIG. 17 is a perspective view illustrating a state just before an optical filter, an optical filter fixing component, and an optical face protecting component are fixed in the state shown in FIG. 16.
Figure 19:
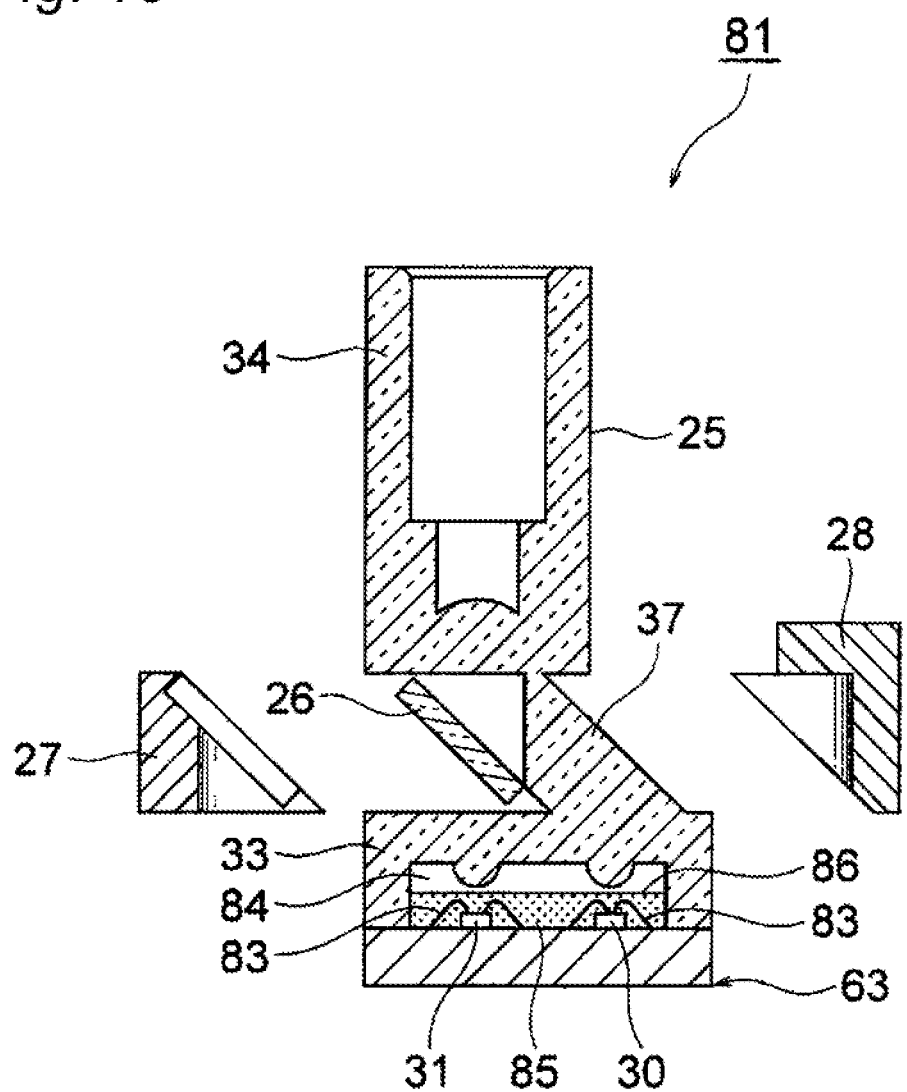
FIG. 19 is a sectional view illustrating the state shown in FIG. 17.

In FIGS. 17 and 19, when the optical filter 26 is first placed on the optical filter mounting portion 36 of the optical path changing component 25, then the optical filter 26 is interposed between the optical filter mounting portion 36 and the optical filter fixing component 27, and the optical face protecting component 28 is fixed to the prism 37 of the optical path changing component 25 (at this time, the through-hole 82 is covered with the optical face protecting component 28), the single-core bidirectional optical communication module 81 is completely assembled as shown in FIG. 18.

According to the invention, since the light-emitting element 30, the light-receiving element 31, and the like are protected by the protective resin 85, it is possible to prevent the deterioration or detachment of the components and the peeling of the bonding wires due to the influence of humidity or the vibration in use or the like.

If the surface of the protective resin 85 is not the plane 86, the surface of the protective resin over the optical elements may be indefinitely oblique (substantially a round shape like a dome) due to the surface tension of the resin, for example, by a general potting method using a high-viscosity protective resin to cause an influence on the optical characteristics, which does not occur in the invention.

In addition, the invention can be modified in various forms without departing from the concept of the invention.

The present application is based on Japanese Patent Application No. 2009-041650 filed on Feb. 25, 2009 and Japanese Patent Application No. 2009-181173 filed Aug. 4, 2009, the entire contents of which are incorporated herein by reference.

Reference Signs List 1, 51, 61, 71, 81: SINGLE-CORE BIDIRECTIONAL OPTICAL COMMUNICATION MODULE 2: SINGLE-CORE BIDIRECTIONAL OPTICAL COMMUNICATION CONNECTOR
3: OPTICAL CONNECTOR HOUSING
4: CONNECTOR INSERTION PORTION
5: MOUNTING PORTION
21: OPTICAL TRANSCEIVER CIRCUIT UNIT
22: OPTICAL UNIT
23: CIRCUIT UNIT BODY
24: LEAD FRAME
25: OPTICAL PATH CHANGING COMPONENT
26: OPTICAL FILTER
27: OPTICAL FILTER FIXING COMPONENT
28: OPTICAL FACE PROTECTING COMPONENT
29: CIRCUIT BOARD
30: LIGHT-EMITTING ELEMENT
31: LIGHT-RECEIVING ELEMENT
32: DRIVING CIRCUIT
33: COMPONENT BODY
34: SLEEVE
35a: PROTRUSION
35b: HOLES
36: OPTICAL FILTER MOUNTING PORTION
37: PRISM
38, 46, 47: CUT THROUGH-HOLE
39, 40, 43: LENS
41: OPTICAL FIBER CABLE
42: 45° PRISM FACE
44: FERRULE
45: CONCAVE PORTION
52: MIRROR
62: RIGID BOARD
63: OPTICAL TRANSCEIVER CIRCUIT UNIT
72: FLEXIBLE RIGID BOARD
73: OPTICAL TRANSCEIVER CIRCUIT UNIT
82: THROUGH-HOLE
83: BONDING WIRE
84: SPACE
85: PROTECTIVE RESIN
86: PLANE

The invention claimed is:
1. An optical communication module comprising:
an optical fiber cable;
a first optical element disposed so that an optical axis thereof is substantially parallel to an optical axis of the optical fiber cable, and configured to transmit or receive a first optical signal;
a second optical element disposed so that an optical axis thereof is substantially parallel to the optical axis of the optical fiber cable, and configured to transmit or receive a second optical signal;
an optical path changing component disposed between the optical fiber cable and the second optical element; and
an optical filter disposed between the optical fiber cable and the first optical element, and configured to transmit the first optical signal and to reflect the second optical signal;
an optical filter mounting portion formed by cutting out a side portion of the optical path changing component; and
an optical filter fixing component fixing a position of the optical filter by interposing the optical filter between the optical filter mounting portion and the optical filter fixing component,
wherein the optical path changing component and the optical filter twice bend an optical path of the second optical signal by 90° every time
wherein the optical filter is neither bonded nor welded to the optical path changing component at least at an optical path of the optical path changing component.

2. The optical communication module according to claim 1, wherein the optical path changing component is formed of a resin.

3. The optical communication module according to claim 1, wherein the first and second optical elements are disposed on a plane of a circuit, and the optical axis of the optical fiber cable is perpendicular to the plane.

4. The optical communication module according to claim 3, wherein the circuit is an optical transceiver circuit.

5. The optical communication module according to claim 4, wherein the optical transceiver circuit includes a flexible rigid board.

6. The optical communication module according to claim 5, wherein a protective resin is filled in a space in the optical path changing component in which the optical elements are present in a state where the optical path changing component and the circuit are fixed.

7. The optical communication module according to claim 6, wherein the protective resin is injected through a through-hole communicating with the space, and
wherein the optical communication module further comprises a component closing the through-hole.

8. The optical communication module according to claim 1, wherein a sleeve guiding a ferrule at an end of the optical fiber cable is integrated with the optical path changing component.

9. The optical communication module according to claim 1, wherein the optical path changing component includes a prism face, and the prism face bends the optical path of the second optical signal by 90°.

10. The optical communication module according to claim 9, wherein a mirror face is formed by electrolytic plating.

11. The optical communication module according to claim 1, wherein the optical path changing component includes a minor face and the mirror face bends the optical path of the second optical signal by 90°.

12. The optical communication module according to claim 11, wherein the minor face is a dielectric multi-layered film.

13. An optical communication connector comprising:
the optical communication module according claim 1; and
an optical connector housing accommodating the optical communication module so that the optical axis of the optical fiber cable is substantially perpendicular to a circuit of the optical communication module.

* * * * *